United States Patent [19]

Cottingham

[11] 3,770,085
[45] Nov. 6, 1973

[54] VEHICLE CLUTCH AND BRAKE
[75] Inventor: Edgar R. Cottingham, Hudson, Ohio
[73] Assignee: General Motor Corporation, Detroit, Mich.
[22] Filed: Jan. 28, 1972
[21] Appl. No.: 221,751

[52] U.S. Cl.............. 192/13 R, 192/18 A, 188/170
[51] Int. Cl............................................. F16d 67/04
[58] Field of Search ........................ 188/170, 106 P; 192/18 A, 83, 86, 13 R, 3 R

[56] References Cited
UNITED STATES PATENTS

| | | | |
|---|---|---|---|
| 3,321,054 | 5/1967 | Johnson et al................ | 192/18 A X |
| 3,613,839 | 10/1971 | MacDuff............................ | 188/170 |
| 3,088,552 | 5/1963 | Christenson et al.......... | 192/18 A X |
| 3,260,331 | 7/1966 | Borman............................ | 188/170 X |
| 3,547,233 | 12/1970 | Girvan................................ | 188/170 |
| 3,614,999 | 10/1971 | Sommer............................. | 192/18 A |

Primary Examiner—Benjamin W. Wyche
Attorney—W. E. Finken et al.

[57] ABSTRACT

A vehicle brake having a stationary housing, an output hub rotatably mounted on the housing and a multiple plate disc brake operatively connected between the housing and the output. The brake plates are spaced such that alternate members are splined to the housing and the output hub. The brake plates are engaged to prevent rotation of the output hub by a pair of pistons one of which is spring applied and pressure released and the other of which is pressure applied. The pistons are actuated independently so that the unactuated piston provides an abutment for the brake plate. The spring applied piston functions as a parking brake so that whenever the vehicle engine is not in operation a plurality of springs urge the piston into engagement with the brake plates to effectively connect the output hub to the stationary housing thereby preventing rotation of the output hub. When the engine is operating, fluid pressure is supplied to the piston to compress the springs thereby disengaging the brake. The fluid pressure to operate the other piston is controlled by a valve to permit selective operation of the brake during vehicle driving to permit the operator to stop or retard the vehicle or in a track laying type vehicle to permit the operator to have steer control. An input shaft is also rotatably mounted in the housing and is selectively connectable with the output hub through a multiple disc clutch to provide a drive to the output hub.

4 Claims, 1 Drawing Figure

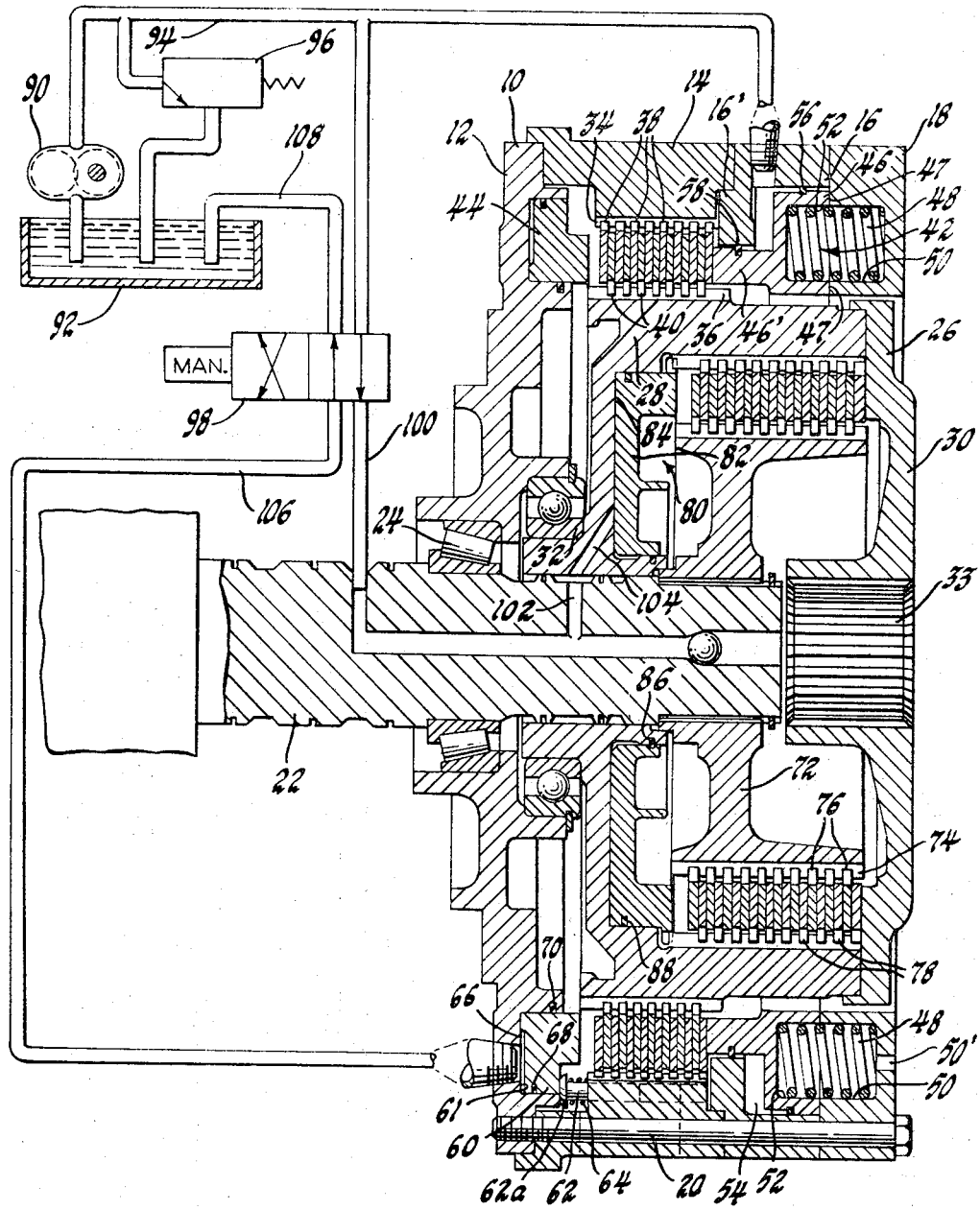

VEHICLE CLUTCH AND BRAKE

This invention relates to vehicle brakes and more particularly to vehicle brakes that can be automatically engaged or selectively engaged.

In many vehicles today it is desirable to provide a parking brake that is engaged when the vehicle engine is not operating. This brake must also be capable of engagement during engine operation to permit the operator to control the speed of the vehicle. The present invention provides operator control of the vehicle output through a pair of fluid motors, one of which responds to a plurality of compression springs to engage a plurality of friction plates operatively connected between a stationary housing and the vehicle output to engage the output brake. This fluid motor also responds to fluid pressure from an engine driven pump such that the springs are compressed and the brake is released whenever the pump is operating. A second fluid motor is responsive to the selective application of fluid pressure from the pump to permit engagement of the vehicle brake when desired by the operator.

It is therefore an object of this invention to provide in an improved vehicle brake a plurality of brake discs splined between a stationary housing and an output member which plates are responsive to a spring applied piston to engage the brake and fluid pressure to release the brake and a second piston responsive to fluid pressure to permit selective engagement of the brake.

Another object of this invention is to provide in an improved vehicle brake a stationary housing member in which is slidably disposed a pair of pistons axially spaced apart adjacent opposite ends of a plurality of friction discs operatively connected between the housing and the output member, one of which pistons is spring applied and pressure released and the other of which is pressure applied to provide selective operation of the brake.

Another object of this invention is to provide in an improved vehicle brake a stationary housing in which is slidably disposed a pair of independently actuated pistons axially spaced adjacent opposite ends of a plurality of friction discs alternately connected between the housing and the output member, one of the pistons is spring applied and pressure released and provides an abutment for the brake plates when the other piston is pressure applied, which other piston provides an abutment for the brake plates when the spring applied piston is operated.

These and other objects and advantages of the invention will be more apparent from the following description and drawing which is a cross-sectional elevational view of the vehicle brake.

Referring to the drawing wherein like characters represent like or corresponding parts, there is shown a housing 10 comprised of a hub 12 and three drums 14, 16 and 18 all of which are secured together by a plurality of fasteners 20. A clutch input shaft 22 or transmission output shaft is rotatably mounted in the hub 12 by a tapered roller bearing 24. An output member 26 comprised of a pair of drums 28 and 30 is also rotatably mounted in the hub 12 by a ball bearing 32. The drum 30 has a splined portion 33 which permits a drive connection with a final output shaft, not shown. The drum 14 and the drum 28 each have a splined portion 34 and 36 respectively. A plurality of friction plates 38 are splined to the drum 14 and a plurality of friction plates 40 alternately spaced of the plates 38 are splined to the drum 28. The plates 38 and 40 are selectively urged into contact by a pair of motors generally designated 42 and 44, such that when the plates 38 and 40 are in contact they prevent or retard rotation of the output member 26.

The motor 42 includes a stepped annular piston 46 having a large and a small external cylindrical surface slidably disposed respectively in a large internal cylindrical surface and a small internal cylindrical surface on the stepped drum 16. The small internal cylindrical surface is on the annular portion 16' of the drum 16. A plurality of springs 48 are located in annular recess 50 and cylindrical recesses 52 in the drum 18 and piston 46 respectively. The annular and other recesses are vented by vent 50'. A fluid chamber 54 is formed between the piston 46 and the drum 16 and a pair of seals 56 and 58 located between the large cylindrical surfaces and located between the small cylindrical surfaces of the piston 46 and drum 16 to prevent fluid leakage from the chamber 54. The piston 46 has flat annular surfaces 47 at the inner and outer perimeter which seat on similar surfaces on drum 18 to axially support piston 46 when it acts as an axially fixed abutment. The springs 48 move the piston 46 into contact with a grounded end plate of the plates 38 and 40 to engage the brake plates against a piston 60 which flatly abuts a base part of cylinder 61 to axially support the piston as an abutment whenever the chamger 54 is not pressurized. Thus, with the motor 42 acting as a motor, the plates 38 and 40 and the motor 44 acting as an abutment cooperate therewith to form a vehicle brake.

The motor 44 includes an annular piston 60 slidably disposed in the annular cylinder 61 in the hub 12. A plurality of rods 62 surrounded by compression springs 64 are located in a bore in hub 14 and compressed between hub 14 and a head 62a on the rods. A fluid chamber 66 is formed between cylinder 61 in the hub 12 and the piston 60. A pair of seals 68 and 70 prevent fluid leakage from the chamber 66. The springs 64 maintain the rods 62 in engagement with the piston 60 to move the piston 60 away from the plates 38 and 40 and so the back surface engages the base of cylinder 61 in drum 12 which is the abutment position whenever fluid pressure is not present in the chamber 66. However, when fluid pressure is present in the chamber 66, the piston 60 will overcome the force in springs 64 to contact the brake plates 38 and 40 and engage them against portion 46' of piston 46 which seats on surfaces 47 and acts as a fixed abutment to cause engagement of the brake thereby preventing or retarding rotation of the output member 26. Thus, with the motor 44 acting as a motor, the plates 38 and 40 and motor 42 acting as an abutment cooperate therewith to form a vehicle brake. The portion 46' engages a major portion of the non-rotatable plate 38 when the piston 46 is acting as a motor or an abutment.

A clutch hub 72 splined to the input shaft 22 has a splined outer diameter 74 to which is splined a plurality of friction plates 76. A plurality of friction plates 78 are alternately spaced on the plate 76 and are splined to the inner diameter of the hub 28. A fluid motor generally designated 80 includes a piston 82 splined to the drum 28 and slidably disposed therein and a fluid chamber 84 formed between the drum 28 and the piston 82. A pair of seals 86 and 88 prevent fluid leakage from the chamber 84. When fluid pressure is admitted to the chamber 84, the piston 82 is moved into contact with the friction plates 76 and 78 to provide a drive connection between the input shaft 22 and the output member 30. Thus, the friction plates 76 and 78 and the fluid motor 80 cooperate to form a drive clutch between the input shaft 22 and the output member 26.

A fluid system for controlling the clutches and brakes is shown schematically and includes an engine driven pump 90 which may be a transmission input and/or output pump. The pump draws fluid from a reservoir 92 and delivers fluid to a passage 94. The pressure in passage 94 is controlled by regulator valve 96. The passage 94 is connected to the chamber 54 to provide disengagement of the vehicle brake when fluid pressure is present and to a control valve 98 which is represented as a two-position four-way valve. In the position shown, the valve 98 directs fluid in passage 94 to passage 100 which is in fluid communication with a passage 102 in the input shaft 22 and a passage 104 in the drum 28 so that fluid pressure is delivered from the pump 90 to the chamber 84 to actuate the fluid motor 80. At the same time, the valve 98 connects a passage 106 to the reservoir 92 via passage 108. The passage 106 is in fluid communication with the chamber 66 such that when chamber 84 is pressurized, chamber 66 is exhausted. If the valve 98 is moved to its second position, fluid pressure in passage 94 is directed to passage 106 to actuate the fluid motor 44 and thereby engage the vehicle brake while the motor 88 is exhausted thereby releasing the drive clutch. Whenever the pump 90 is inoperative, the passage 94 will not be pressurized so that the springs 84 will cause the piston 46 to engage the brake plates 38 and 40 to engage the vehicle brake thereby preventing rotation of the output member 26. Also, since the passage 94 is not pressurized, the motors 44 and 80 will also be inactive so that the drive clutch is disengaged. A more sophiscated control system, such as that disclosed in U.S. Pat. No. 2,941,639 issued to Christenson et al., may be incorporated with the clutch and brakes disclosed above.

Obviously, many modifications and variations are possible in light of the above description. Therefore, it is to be understood that within the scope of the appended claims, the invention may be practiced otherwise than as specifically described.

What is claimed is:

1. A vehicle output drive comprising housing means; input means rotatably mounted in said housing means; output means rotatably mounted in said housing means having a portion circumjacent said input means; brake means selectively operatively connected between said housing means and said output means for selectively preventing rotation of said output means including a plurality of disc members alternately splined to said housing means and said output means, first piston means slidably disposed in said housing means adjacent one of said disc members, spring means for urging said first piston into contact with said one disc member to engage said brake means, first chamber means formed between said housing means and said first piston being selectively pressurized to move said piston out of contact with said one disc member to disengage said brake means, a second piston slidably disposed in said housing means adjacent another of said disc members, and second chamber means formed by said housing means and said second piston means and being selectively pressurized to move said second piston into contact with said other disc member to engage said brake.

2. The invention defined in claim 1 and said output drive including a drive clutch comprising a plurality of friction plates alternately operatively connected between said input means and said output means, and selectively operable fluid motor means adjacent said plates for engaging said drive clutch.

3. A vehicle output brake comprising stationary housing means, output drive means rotatably mounted in said housing means and selectively operable brake means including a plurality of disc members alternately splined to said housing means and said output drive means, first piston means slidably disposed in said housing means adjacent one of said disc members, spring means urging said first piston means into contact with said one of said disc members to engage said brake means, first pressure chamber means adjacent said first piston means for selectively moving said first piston means against said spring means to disengage said brake means when said chamber is pressurized, second piston means adjacent another of said disc members and second pressure chamber means adjacent said second piston means for selectively moving said second piston means into contact with said another of said disc members when said second chamber is pressurized to engage said brake means independently of spring actuation of said first piston means.

4. A vehicle output brake comprising, housing means; output means rotatably mounted in said housing means; a plurality of brake disc means alternately splined to said hhousing means and said output means; first fluid motor means including piston means having engaged and disengaged positions; spring means for moving said first motor piston means to said engaged position for engaging said brake and said first motor piston means being responsive to the application of fluid pressure to move to the disengaged position for disengaging said brake; and second fluid motor means including piston means having engaged and disengaged positions and being responsive to the application of fluid pressure to move to the engaged position for engaging said brake independently of spring actuation of said first fluid motor piston means; said piston means of said first motor means providing an abutment for said second motor means when said first motor piston means is in the disengaged position and said piston means of said second motor means providing an abutment for said first motor means when said second motor piston means in the disengaged position during the independent spring and fluid pressure actuation of said piston means of said first and second motor means respectively.

* * * * *